United States Patent [19]

Stemmler et al.

[11] 4,355,074

[45] Oct. 19, 1982

[54] BONDING SHEET-LIKE MATERIAL TO A SUBSTRATE FROM WHICH IT CAN BE DRY-STRIPPED

[75] Inventors: Hermann Stemmler, Walluf; Volker Knittel, Wiesbaden, both of Fed. Rep. of Germany

[73] Assignee: Hoechst Aktiengesellschaft, Frankfurt am Main, Fed. Rep. of Germany

[21] Appl. No.: 162,666

[22] Filed: Jun. 24, 1980

[30] Foreign Application Priority Data

Jun. 30, 1979 [DE] Fed. Rep. of Germany ....... 2926481

[51] Int. Cl.³ ................................................ C09J 7/02
[52] U.S. Cl. ...................................... 428/350; 40/594; 52/746; 156/71; 156/83; 156/94; 156/152; 156/247; 156/254; 156/308.8; 156/310; 156/318; 156/344; 427/207.1; 427/415; 428/40; 428/212; 428/354; 428/355
[58] Field of Search .................... 156/71, 152, 83, 247, 156/94, 254, 344, 308.8, 310, 318; 427/207.1, 415; 52/746; 40/594; 428/40, 354, 212, 355, 350

[56] References Cited

U.S. PATENT DOCUMENTS

| | | | |
|---|---|---|---|
| 2,047,978 | 7/1936 | MacLaurin | 428/354 |
| 2,608,504 | 8/1952 | Meyer et al. | 156/71 |
| 2,793,966 | 5/1957 | Davis | 428/355 |
| 3,212,957 | 10/1965 | Linda et al. | 156/71 |
| 3,257,225 | 6/1966 | Marotta et al. | 427/207.1 |
| 3,275,469 | 9/1966 | Streit | 156/71 |
| 3,640,756 | 2/1972 | Beersma et al. | 428/350 |

FOREIGN PATENT DOCUMENTS

| | | | |
|---|---|---|---|
| 1049714 | 3/1979 | Canada. | |
| 2188641 | 2/1974 | France | 156/71 |

*Primary Examiner*—John J. Gallagher
*Attorney, Agent, or Firm*—Berman, Aisenberg & Platt

[57] ABSTRACT

Sheet-like material, such as wallpaper, posters or labels, can be stripped dry from surfaces to which they have been bonded after adhesive layers (applied in an aqueous medium) have dried. Adhesives which contain film-forming, water-soluble or water-swellable polymers are used. Separate layers containing two different adhesive polymers, particularly polysaccharide derivatives, are provided between the sheet-like material and the surface to which it is to be bonded, one of the two layers containing at least one non-ionic polymer and the other containing at least one ionic polymer. The invention includes the use of these adhesives (containing different film-forming, water-soluble or water-swellable polymers) in preparing dry-strippable sheet-like material and sheet-like material, such as wallpaper, posters or labels, having adhesive layers which can be reactivated by moistening with water and which comprise these adhesives.

21 Claims, No Drawings

BONDING SHEET-LIKE MATERIAL TO A SUBSTRATE FROM WHICH IT CAN BE DRY-STRIPPED

TECHNICAL FIELD

Sheet-like materials, such as wallpaper, posters or labels, are provided with adhesive by the manufacturer, which adhesive, after drying, is reactivated by the user by moistening with water, or are provided with adhesive directly by the user. After the sheet-like material is bonded to a substrate and the adhesive therebetween is permitted to dry, the sheet-like material can be dry-stripped from the substrate. Two contiguous layers of different adhesives are used to achieve this result.

BACKGROUND

The removal of old wallpaper or other sheet-like material, such as posters or labels, fixed to walls or other surfaces is ordinarily laborious and involves contamination of the surroundings; for example, it is usually necessary to wet old wallpaper thoroughly with water several times before stripping and/or scraping it off from walls. Since many dwellings have floor coverings which are easily damaged by water or by adhesive residues, expensive measures are necessary to protect them while wallpaper is being removed. Moreover, in recent years, wallpaper and other wallfacing material often have a wet-strength finish or a washable coating which substantially prevents their removal with water or greatly increases the difficulty (for example by necessitating the use of solutions which contain wetting agents) of such removal.

Several alternatives for stripping sheet-like material dry from a substrate are:

1. Modification of the wall or a comparable area, to which such materials are to be bonded, on their surface or in bulk, in order to reduce the interaction with an adhesive which is to be applied (for example, using a wax emulsion or waste paper which has been rendered hydrophobic).
2. Use of "multi-ply wallpaper"; that is, sheet-like material which is built up from at least two layers and which can be split between two layers, at least one layer remaining (after splitting) on the surface to which the material had been bonded.
3. Use of sheet-like material which is coated on the back or modified in bulk and which can therefore exert a weaker interaction with an adhesive which is to be applied.
4. Modification of the adhesive by admixing with it substances which reduce its adhesive strength.

Such possibilities are mentioned in the following publications:

German Offenlegungsschrift No. 2,148,423 describes a paper sheet (as base material for strippable wallpaper, strippable poster papers or the like) comprising a pair of paper webs which are joined to one another in an adjacent arrangement by a zone of comparably weak bonding strength over the entire range of their surfaces in mutual contact. To prevent penetration (through the layers) of an adhesive which is to be applied, the paper webs contain resin-based priming coats.

German Offenlegungsschrift No. 2,237,422 concerns a process for manufacturing a strippable base paper for wallpapering. A polyester-fiber nonwoven is incorporated into the aqueous phase of paper stuff as the latter runs into the paper machine. Moreover, the paper may be impregnated with a hydrophobic emulsion, using an additionally-provided sizing press.

The paper, consisting of two fiber layers felted with one another, for wallpaper and posters according to German Patent Specification No. 2,361,996 (=Canadian Patent Specification No. 1,049,714) has a surface which (after the paper has been bonded to a brick or other wall by means of an adhesive) permits the paper to be detached from the bonding by simple stripping. In this paper, one of the fiber layers corresponds to a conventional base paper for wallpaper; the other is a wallpaper base paper in which 40 to 80% by weight of all fibers are polyolefin fibers and which contains from 0.5 to 5%, relative to the weight of all the fibers, of a thermoplastic synthetic or natural material which has been flocculated from an aqueous dispersion.

A process for producing one-sided gumming on sheet-like support webs, particularly wallpaper webs, is carried out (German Auslegeschrift No. 1,921,800) by applying (in addition to the layer of paste or adhesive) a swelling layer (for example a layer of borax or boric acid) in any desired sequence; it is said that the position of a wallpaper manufactured from this support web can easily be corrected after the wallpaper has been hung on the wall.

According to German Offenlegungsschrift No. 2,056,566, an adhesive (for hanging wall coverings which, after hanging and drying, can readily be removed from the carrier surface) contains particles of a hydrophobic material, for example a wax, a salt of a fatty acid, or polyethylene, in addition to conventional adhesive which can be activated with water.

German Offenlegungsschrift No. 2,343,090 describes an adhesive (which can be stirred with water to give a paste) for bonding fibrous cellulose webs, such as wallpapers, to masonry walls. The adhesive contains 10 to 90% by weight of a cellulose ether, starch or starch ether and 90 to 10% by weight of a non-adhesive, finely powdered organic polymer, such as microcrystalline cellulose, polyethylene or a polyolefin oxide. It is said that wallpaper coated with the adhesive and hung on building walls can be removed from the latter quickly and with clean working by simple stripping and without soaking with water.

German Offenlegungsschrift No. 2,615,725 relates to an adhesive for hanging wallpaper, wall coverings and textile coverings on walls, or fixing them to ceilings or floors of a room in a building or the like, which adhesive consists of conventional adhesive and a powder of particles of very small size, which do not dissolve in the adhesive, do not react with the adhesive and only weakly adhere to the latter or not at all; by this means, it is said that the dried adhesive layer can later be split by stripping the wallpaper or covering which has been hung by means of this adhesive. Quartz flour, glass flour, powdered PVC or polyethylene and rubber flour are mentioned as suitable additive powders, and the adhesive layer is said to split along the wallpaper or covering into two thinner layers, one of which should remain adhering to the wallpaper or covering and the other to the substrate. As a supplement to this, German Offenlegungsschrift No. 2,707,570 indicates that adhesives of this type can be applied by the manufacturer of the wallpaper or covering and then need only be reactivated by the user. Alternatively, such wallpaper can be applied together with an additional adhesive.

Prior proposals for providing a sheet-like material which can be stripped dry, however, have the following disadvantages:—When the surface to which the material is to be bonded has been rendered hydrophobic, it is very difficult to reverse this effect since the surface has then become more or less water-repellent; as a result, difficulties also arise during hanging with adhesives which, as a rule, contain water.

The separate application of waste paper before hanging is a laborious additional working step; moreover, it is difficult to remove the waste again.

Modification of the back (that is, the side which is to be bonded) or modification in bulk of sheet-like material which is to be bonded frequently results, on stripping, in leaving an adhesive layer on the substrate; detachment of the back coating also occurs. Since the adhesive power of commercially-available adhesives differs, combination with modified sheet-like material can also lead to inadequate or excessive adhesion.

After stripping one half of a "multi-ply wallpaper", the other half (including the adhesive layer) remains on the wall so that the substrate, to which the material is to be bonded, is gradually completely changed; adhesion problems also arise if several paper layers are present.

The effectiveness of the modified adhesives depends very strongly on the nature of the substrate to which the materials are to be bonded and on the structure of the sheet-like material which is to be bonded; dry strippability is frequently not ensured in practice.

THE INVENTION

The invention is primarily directed to providing adhesive which will permit sheet-like material to be bonded securely to a substrate and, subsequently, to be dry-stripped from the substrate. It has several distinct aspects:

(a) A sheet-like material, such as wallpaper, a poster or a label, coated on one (its back) side with a layer of at least one film-forming water-soluble or water-swellable ionic adhesive polymer or with a layer of at least one film-forming water-soluble or water-swellable non-ionic adhesive polymer;

(b) A sheet-like material, such as wallpaper, a poster or a label, coated on one (its back) side with two contiguous layers of different film-forming water-soluble or water-swellable adhesive polymers, one of the layers comprising at least one ionic adhesive polymer and the other comprising at least one non-ionic adhesive polymer;

(c) Sheet-like material (b) wherein the layer comprising at least one non-ionic adhesive polymer is substantially coextensive with, interposed between and in direct contact with both the sheet-like material and the layer comprising at least one ionic adhesive polymer;

(d) Sheet-like material (b) or (c) adhered to a substrate by the adhesive layers, which are between the sheet-like material and the substrate and which permit the sheet-like material to be dry-stripped from the substrate;

(e) Use of two contiguous and substantially coextensive layers of different film-forming water-soluble or water-swellable adhesive polymers, one layer comprising at least one non-ionic adhesive polymer and the other comprising at least one ionic adhesive polymer, to form a dry-strippable bond between sheet-like material and a substrate to which it is bonded;

(f) A process for producing (d) which comprises applying one of the adhesive layers in an aqueous medium to the back side of the sheet-like material, drying that adhesive layer or permitting it to dry, applying the other adhesive layer in an aqueous medium either to the thus-dried layer or to the substrate, and positioning the sheet-like material on the substrate so that the two adhesive layers are between the sheet-like material and the substrate;

(g) A process similar to (f) in which the layer which is dried or permitted to dry is applied to the substrate; and (h) A process similar to (f) in which both layers are dried or permitted to dry and at least one layer is reactivated by moistening with water shortly before the sheet-like material is positioned on the substrate.

An object of the present invention is to provide a process for adhesive bonding sheet-like material, for example paper, to a substrate so that it can be subsequently stripped dry (after the adhesive has dried) and without residue from the substrate. The process is carried out with diverse types and grades of sheet-like material and/or substrates to which the former is to be bonded.

This and other objects are apparent from the noted distinct aspects and from the following description.

DETAILS

The starting point of the invention is a process for adhesive bonding sheet-like material, such as wallpaper, posters or labels, to a substrate in a manner which permits it to be stripped dry from the substrate after the adhesive (applied in an aqueous medium) has dried. The adhesives contain film-forming, water soluble or water-swellable polymers. Layers containing two different adhesive polymers are provided between the sheet-like material and the substrate to which the sheet-like material is to be bonded. One of two layers of adhesive polymer contains at least one non-ionic polymer and the other contains at least one ionic polymer.

The sheet-like materials preferably include wallpaper, posters and labels. These are ordinarily manufactured from paper pulp with a cellulose-fiber base, but are optionally prepared from paper pulp which contains or consists of synthetic fiber, such as polyolefin fiber, in addition to cellulose fiber. The invention is not so limited, however, and other sheet-like materials, such as wall coverings on a textile base or based on sheets of synthetic polymer, are also encompassed.

Customarily, diverse adhesives consisting of or comprising natural, semi-synthetic or synthetic polymers are used for bonding such sheet-like materials. According to the invention, however, two adhesive layers are required; these respectively contain two different polymers as essential adhesive components. One of the two is a non-ionic adhesive polymer, and the other is an ionic adhesive polymer; in particular, these layers are arranged in such a way that the layer containing the non-ionic polymer is preferably adjacent to the sheet-like material, and the layer containing the ionic polymer is thus preferably adjacent to the surface to which the sheet-like material is bonded.

Suitable non-ionic polymers within the scope of the invention are, for example, the following: alkylcelluloses, such as methylcellulose and ethylcellulose, hydroxyalkylcelluloses, such as hydroxyethylcellulose, mixed ethers of the latter, such as methyl-hydroxyethylcellulose, methyl-hydroxypropylcellulose or ethylhydroxyethylcellulose, and also those mixed ethers which carry a minor proportion (that is, a proportion which is smaller than that of non-ionic groups) of ionic groups; starch ethers, vegetable gums which are substituted by non-ionic groups, such as carob bean flour, polyvinyl alcohol, polyvinyl ethers, polyvinyl esters, such as polyvinyl acetate, polyvinylpyrrolidone, polyurethanes and mixtures of these compounds.

Suitable ionic polymers include, for example, carboxymethylcellulose or carboxyethylcellulose, sulfoethylcellulose, and also corresponding mixed ethers which contain a minor proportion (that is, a proportion which is smaller than that of ionic groups) of non-ionic groups, oxidized celluloses, alginates, alginic acid esters, carboxymethylstarch, oxidized starches, starch phosphates, vegetable gums which are substituted by ionic groups, polyacrylamide, polyacrylates and mixtures of these compounds.

Amongst the polymers, polysaccharide derivatives, particularly cellulose ethers, are preferably used, especially as non-ionic cellulose ethers hydroxyethylcellulose having a DS of 0.4 to 1.2 and an MS of 1.2 to 3.0, methyl-hydroxyethylcellulose having a DS of 1.3 to 2.2, methyl-hydroxypropylcellulose having a DS of 1.3 to 2.2, or ethyl-hydroxyethylcellulose having a DS of 1.2 to 1.8 and as ionic cellulose ethers carboxymethylcellulose having a DS of 0.4 to 1.3 or sulfoethylcellulose having a DS of 0.3 to 1.2. The adhesives are applied in an aqueous medium; as a rule, these are delivered as a powder or as granules to commercial or private users, who mix the latter with water to prepare an adhesive which is ready for use and can be spread. In addition to the adhesive polymers already mentioned, the adhesives optionally also contain one or more non-adhesive water-soluble water-dispersible components (for example, for influencing the adhesive power, as a stirring aid, as a dispersing agent and the like), such as polyalkylene glycols, polyethylene, polyalkylene glycol ethers or esters, polyolefin oxides, fatty alcohols, fatty acids, soaps, glycerides, fatty amides, wax alcohols, waxes, ester waxes, saccharides or salts; furthermore, customary additives, such as wetting agents, anti-foam agents, preservatives, perfuming agents, fillers or pigments, are optionally incorporated in one or both of the adhesive layers.

Advantageously, the process according to the invention is carried out in one of the three following variants for which the manufacturer of the sheet-like material (to be bonded) can make certain preliminary provisions:

The surface to which the material is to be bonded is spread with one of the two different adhesives, preferably with the adhesive which contains the ionic polymer; after drying of this layer, the sheet-like material is spread with the other of the two adhesives, preferably with the adhesive which contains the non-ionic polymer, and bonding is carried out in the customary manner.

The surface to which the material is to be bonded is spread as above, and the sheet-like material (pre-coated with the other dry adhesive which is reactivated again by the user by moistening with water to give the adhesive) is bonded to the surface in the customary manner, or the sheet-like material, which has already been pre-coated once, is spread with an adhesive which differs from the first adhesive and is bonded.

The sheet-like material is pre-coated with both adhesive layers, which are dry, and the adhesive is reactivated by the user by moistening with water to yield the adhesive, after which the sheet-like material is bonded in the customary manner.

In addition to the process according to the invention, other objects are achieved, on the one hand, by using the adhesives containing the previously-mentioned different polymers for bonding sheet-like materials and, on the other hand, by the sheet-like materials pre-coated with these different adhesives.

The sheet-like materials bonded in accordance with the invention remain firmly adherent to the surface, to which they have been bonded, after the adhesive has dried, but they can later be stripped from the surface by hand as whole webs or at least as large pieces (without soaking or other special pre-treatment) after one bit for gripping has been lifted off the wall with or without the aid of an instrument. The two adhesive layers are then split from one another; that is, one of the two layers remains on the surface to which the material has been bonded before, and the other remains on the stripped sheet-like material.

New material can then frequently be bonded to this surface even without a renewed two-layer application; that is, a single coating of the sheet-like material, which is to be bonded, then suffices without pre-treatment of the surface to which it is to be bonded. Both of the adhesive layers can readily be removed again from the corresponding support material, using water, if this is desired. Dry strippability is ensured for the most diverse substrates and types of sheet-like material.

The percentage data given in the Examples which follow relate to weight. The viscosities of the polymers were determined on a 2% strength aqueous solution at 20° C. according to Höppler, and they are stated in mPa.s. The degree of substitution are given as the DS, which is the amount of substituted functional groups per polymer unit (e.g., 0 to 3 hydroxyl groups per anhydro-D-glucose unit of a polysaccharide) or as the MS, which is the number of molecules by which one polymer unit has been substituted.

EXAMPLE 1

4 Parts by weight of Na alginate, having a viscosity of 4,000, are dissolved in 196 parts by weight of water, and about 140 g/m$^2$ of this solution are applied to a wall covered with sandwich-type plasterboard. After this first adhesive layer has dried, a wallpaper web, spread with about 160 g/m$^2$ of a solution of 60 parts by weight of water and 1 part by weight of a hydroxyethylcellulose (HEC) having an MS of 1.9 or a methylhydroxyethylcellulose (MHEC) having a DS of 1.7, in either case having a viscosity of 7,000, is fixed over the first adhesive layer. After the laminate has dried, the wallpaper web adheres sufficiently firmly to the substrate, but it can readily be stripped dry in any desired direction; this effect is still achieved even after a residence time of several months.

EXAMPLE 2

The procedure followed is as indicated in Example 1, but the first layer on the substrate is produced from an adhesive consisting of 4 parts by weight of a Na carboxymethylcellulose (NaCMC) having a viscosity of 6,000 and a DS of 0.7, 6 parts by weight of a water-soluble ester wax based on montan wax (with a density of 1.2 g/m$^2$, an acid number of 0 to 5, and a saponification number of 0 to 15) and 250 parts by weight of water, and the second layer on the wallpaper web is produced from an adhesive consisting of 8 parts by weight of a MHEC of a viscosity of 2,000 and a DS of 1.8, 2 parts by weight of a polyvinyl acetate powder dispersible in water (average molecular weight 30,000 to 500,000) and 200 parts by weight of water.

EXAMPLE 3

The procedure followed is as in Example 1, but the first layer on the substrate is produced from an adhesive consisting of 2.5 parts by weight of NaCMC of a viscosity of 1,000 and a DS of 0.65, 100 parts by weight of water and 45 parts by weight of an aqueous polyethylene dispersion (solids content about 40%, size of the solid particles about 0.12 $\mu$m, molecular weight about 18,000), and the second layer on the wallpaper web is produced from an adhesive consisting of a 1.5% strength aqueous ethyl-hydroxyethylcellulose solution (EHEC, viscosity 6,000, DS 1.5).

EXAMPLE 4

The procedure followed is as in Example 1, but the first layer on a gypsum plaster substrate is produced from an adhesive consisting of 3 parts by weight of a carboxymethyl starch (CMS, viscosity 5,000, DS 0.3), 7 parts by weight of a polyethylene glycol having a molecular weight of about 10,000 and 150 parts by weight of water, and the second layer on the wallpaper web is produced from an adhesive consisting of a 2% strength aqueous methylhydroxypropylcellulose solution (MHPC, DS 1.7, viscosity 4,500).

EXAMPLE 5

The procedure followed is as in Example 1, but the first layer on a glass substrate is produced from an adhesive consisting of 4 parts by weight of Na polyacrylate of a viscosity of 12,000, 6 parts by weight of a water-soluble ester wax based on montan wax and 200 parts by weight of water, and the second layer on paper labels is produced from an adhesive consisting of a 5% strength aqueous hydroxyethyl starch solution (HES, viscosity 500, MS 0.5).

EXAMPLE 6

The procedure followed is as in Example 1, but the first layer on a gypsum/lime plaster substrate is produced from an adhesive consisting of 7 parts by weight of NaCMC (containing salt and having a proportion of NaCMC of about 60%, viscosity 8,000, DS 0.6), 3 parts by weight of a water-soluble ester wax based on montan wax and 250 parts by weight of water, and the second layer on the wallpaper web is produced from an adhesive consisting of 90 parts by weight of a 2% strength aqueous MHEC solution (viscosity 2,000, DS 1.8) and 10 parts by weight of an aqueous polyethylene dispersion (solids content about 40%).

EXAMPLE 7

A wallpaper web is coated with a mixture [90 parts by weight of a 4% strength aqueous HEC solution (viscosity 1,000, MS 2.0) and 10 parts by weight of an aqueous polyethylene dispersion (solids content about 40%)] in an amount of about 150 g/m$^2$ and is dried. The wallpaper pre-coated in this way is then bonded by means of 180 g/m$^2$ of an adhesive consisting of 4 parts by weight of NaCMC (viscosity 1,000, DS 0.65), 6 parts by weight of a water-soluble ester wax based on montan wax and 250 parts by weight of water, by applying this adhesive to the pre-coated wallpaper. After drying of the laminate, the wallpaper adheres sufficiently firmly to a substrate of asbestos-cement sheeting, but the wallpaper web can readily be subsequently stripped dry in any desired direction; this effect is still achieved after a residence time of several months.

EXAMPLE 8

A wallpaper web is coated in accordance with the instructions of Example 7, but a second layer of 130 g/m$^2$ of an adhesive [3 parts by weight of NaCMC (viscosity 6,000, DS 0.7), 1 part by weight of NaCMC chemically crosslinked with epichlorohydrin (about 70% of water-insoluble constituents, highly absorbent and highly swellable, according to U.S. Pat. No. 3,589,364), 6 parts by weight of a water-soluble ester wax based on montan wax and 250 parts by weight of water] is applied on top of the first layer and dried. Before hanging, the wallpaper web is immersed in water for about 30 seconds, allowed to soak for about 5 minutes and is then conventionally hung on gypsum plaster. After drying of the laminate, the wallpaper web adheres sufficiently firmly to the substrate, but it can be readily stripped dry in any desired direction; this effect is still achieved even after a residence time of several months.

The invention and its advantages are readily understood from the preceding description. Various changes may be made in the specific adhesives in the nature and order of their application, and the nature of both the sheet-like material and the substrate to which it is applied, in the process of applying the sheet-like material to the substrate and in the use of particular combinations of ionic and of non-ionic adhesive polymers to prepare sheet-like material firmly bonded to a substrate in a manner in which it can be subsequently dry-stripped from such substrate without departing from the spirit and scope of the invention or sacrificing its material advantages. The starting materials, the intermediate products, the processes, the finished products and the methods of use hereinbefore described are merely illustrative of preferred embodiments of the invention.

What is claimed is:

1. Dry-strippable sheet-like material in juxtaposition to and coextensive over a substantial proportion of surface area with two contiguous adhesive layers, adhesive of each layer comprising film-forming water-soluble or water-swellable polysaccharide derivative polymer, one layer being that of at least one non-ionic polysaccharide derivative and the other layer being that of at least one ionic polysaccharide derivative; one of the two adhesive layers being interposed between and in direct contact with both the sheet-like material and the other adhesive layer.

2. Sheet-like material according to claim 1 wherein the layer immediately adjacent the sheet-like material is that of at least one non-ionic polysaccharide derivative.

3. Sheet-like material according to claim 1 in combination with a substrate to which it is adhered, the two adhesive layers being between the sheet-like material and the substrate.

4. A combination according to claim 3 wherein the layer of at least one non-ionic polysaccharide derivative is immediately adjacent the sheet-like material and the layer of at least one ionic polysaccharide derivative is immediately adjacent the substrate.

5. Sheet-like material according to claim 2 wherein the sheet-like material is wallpaper.

6. Sheet-like material according to claim 2 wherein the sheet-like material is a poster.

7. Sheet-like material according to claim 2 wherein the sheet-like material is a label.

8. Sheet-like material according to claim 2 wherein at least one of the polysaccharide derivatives is a cellulose ether.

9. Sheet-like material according to claim 2 wherein the non-ionic polysaccharide derivative is a (lower)alkylcellulose, a hydroxy(lower)alkylcellulose or a corresponding mixed ether and the ionic adhesive polymer is carboxymethylcellulose.

10. Sheet-like material according to claim 9 wherein the non-ionic polysaccharide derivative is methyl-hydroxethyl-cellulose, methyl-hydroxypropyl-cellulose or ethyl-hydroxyethyl-cellulose.

11. Sheet-like material according to claim 1 wherein adhesive of each layer consists essentially of a film-forming water-soluble or water-swellable polysaccharide derivative.

12. Sheet-like material according to claim 1 or claim 11 wherein the non-ionic polysaccharide derivative is a member selected from the group consisting of an alkyl cellulose, a hydroxyalkyl cellulose, a mixed ether of the latter, a starch ether and a vegetable gum which is substituted by a non-ionic group, and wherein the ionic polysaccharide derivative is a member selected from the group consisting of carboxymethyl cellulose, carboxyethyl cellulose, sulfoethyl cellulose, an oxidized cellulose, an alginate, carboxymethyl starch, an oxidized starch and a starch phosphate.

13. Sheet-like material according to claim 2 wherein the non-ionic polysaccharide derivative is a member selected from the group consisting of an alkyl cellulose, a hydroxyalkyl cellulose, a mixed ether of the latter, a starch ether and a vegetable gum which is substituted by a non-ionic group, and wherein the ionic polysaccharide derivative is a member selected from a group consisting of carboxymethyl cellulose, carboxyethyl cellulose, sulfoethyl cellulose, an oxidized cellulose, an alginate, carboxymethyl starch, an oxidized starch and a starch phosphate.

14. Sheet-like material according to claim 1 or claim 11 wherein at least one of the polysaccharide derivatives is a cellulose ether.

15. Sheet-like material according to claim 1 or claim 11 wherein the non-ionic polysaccharide derivative is a (lower)alkyl cellulose, a hydroxy(lower)alkyl cellulose or a corresponding mixed ether and the ionic polysaccharide derivative is carboxymethyl cellulose.

16. Sheet-like material according to claim 1 or claim 11 wherein the non-ionic polysaccharide derivative is methylhydroxyethyl-cellulose, methyl-hydroxy-propyl-cellulose or ethyl-hydroxyethyl-cellulose.

17. A process for dry-strippably bonding sheet-like material to a substrate which comprises interposing between the sheet-like material and the substrate two substantially coextensive layers of different film-forming, water-soluble or water-swellable adhesive polysaccharide derivatives, one of the two layers consisting essentially of at least one non-ionic polysaccharide derivative selected from the group consisting of an alkyl cellulose, a hydroxyalkyl cellulose, a mixed ether of the latter, a starch ether and a vegetable gum which is substituted by a non-ionic group, and the other of the two layers consisting essentially of at least one ionic polysaccharide derivative selected from the group consisting of carboxymethyl cellulose, carboxyethyl cellulose, sulfoethyl cellulose, an oxidized cellulose, an alginate, carboxymethyl starch, an oxidized starch and a starch phosphate.

18. A process according to claim 17 of bonding sheet-like material to a substrate from which it can subsequently be stripped dry, which comprises:
applying in an aqueous medium a first layer of film-forming, water-soluble or water-swellable polysaccharide derivative to a surface of the sheet-like material or to a surface of the substrate and permitting the first layer to dry,
applying in an aqueous medium a second layer of film-forming, water-soluble or water-swellable polysaccharide derivative to the first layer or to the surface to which the first layer was not applied,
affixing the sheet-like material to the substrate so that the first and second layers of polysaccharide derivative are in juxtaposition and interposed between said sheet-like material and said substrate; one layer being that of at least one non-ionic polysaccharide derivative, and the other layer being that of at least one ionic polysaccharide derivative.

19. A process according to claim 18 wherein the adhesive polysaccharide derivative layer in direct contact with and immediately adjacent to the sheet-like material is that of at least one non-ionic polysaccharide derivative, and the layer immediately adjacent the substrate is that of at least one ionic polysaccharide derivative.

20. Sheet-like material coated with two successive substantially contiguous and coextensive dry layers of different film-forming water-soluble or water-swellable adhesive polymers, one of the two layers comprising at least one non-ionic polysaccharide derivative and the other of the two layers comprising at least one ionic polysaccharide derivative, both layers of which are subject to reactivation by moistening with water.

21. Sheet-like material according to claim 20 wherein each of the two dry layers consists essentially of at least one polysaccharide derivative.

* * * * *

UNITED STATES PATENT AND TRADEMARK OFFICE
CERTIFICATE OF CORRECTION

PATENT NO. : 4,355,074

DATED : October 19, 1982

Page 1 of 2

INVENTOR(S) : Hermann STEMMLER and Volker KNITTEL

It is certified that error appears in the above-identified patent and that said Letters Patent are hereby corrected as shown below:

Column 9, line 7, "adhesive polymer" should read --polysaccharide derivative--; line 11, "hydroxethyl" should read --hydroxyethyl--.

Claim 1 remains the same.
 Claim 11 is renumbered as claim 2, dependent on claim 1.
 Claim 2 is renumbered as claim 3, dependent on claim 1 or renumbered claim 2.
 Claim 5 is renumbered as claim 4, dependent on renumbered claim 3.
 Claim 6 is renumbered as claim 5, dependent on renumbered claim 3.
 Claim 7 is renumbered as claim 6, dependent on renumbered claim 3.
 Claim 8 is renumbered as claim 7, dependent on renumbered claim 3.
 Claim 13 is renumbered as claim 8, dependent on renumbered claim 3.
 Claim 9 remains as claim 9, dependent on renumbered claim 3.
 Claim 10 remains the same.
 Claim 3 is renumbered as claim 11, dependent on claim 1 or renumbered claim 2.
 Claim 4 is renumbered as claim 12, dependent on renumbered claim 11.
 Claim 14 is renumbered as claim 13, dependent on claim 1 or renumbered claim 2.
 Claim 15 is renumbered as claim 14, dependent on claim 1 or renumbered claim 2.
 Claim 16 is renumbered as claim 15, dependent on claim 1 or renumbered claim 2.
 Claim 20 is renumbered as claim 16.
 Claim 21 is renumbered as claim 17, dependent on renumbered claim 16.
 Claim 12 is renumbered as claim 18, dependent on claim 1, renumbered claim 2 or renumbered claim 17.

UNITED STATES PATENT AND TRADEMARK OFFICE
CERTIFICATE OF CORRECTION

PATENT NO. : 4,355,074

DATED : October 19, 1982

INVENTOR(S) : Hermann STEMMLER and Volker KNITTEL

It is certified that error appears in the above–identified patent and that said Letters Patent are hereby corrected as shown below:

Claim 17 is renumbered as claim 19.
    Claim 18 is renumbered as claim 20, dependent on renumbered claim 19.
    Claim 19 is renumbered as claim 21, dependent on renumbered claim 20.

Signed and Sealed this

Sixteenth Day of October 1984

[SEAL]

Attest:

GERALD J. MOSSINGHOFF

Attesting Officer    Commissioner of Patents and Trademarks